United States Patent [19]

Rodgers

[11] Patent Number: 5,538,189
[45] Date of Patent: Jul. 23, 1996

[54] SWIVEL FLUID FITTING

[75] Inventor: Michael C. Rodgers, Greensburg, Ind.

[73] Assignee: Ransburg Corporation, Indianapolis, Ind.

[21] Appl. No.: 206,120

[22] Filed: Mar. 4, 1994

[51] Int. Cl.⁶ .................................................. B05B 15/08
[52] U.S. Cl. ........................ 239/587.5; 285/276; 901/43
[58] Field of Search ........................... 239/587.1, 587.5; 414/744.5; 901/43, 28, 29, 15; 285/276, 277

[56] References Cited

U.S. PATENT DOCUMENTS

| Re. 3,768 | 12/1869 | Lawton et al. ............... 285/277 X |
|---|---|---|
| 34,476 | 2/1862 | Bliss ................................ 285/277 |
| 66,804 | 7/1867 | Curtis et al. ...................... 285/277 |
| 755,325 | 3/1904 | Soutar . | 
| 883,941 | 4/1908 | Eagan ............................. 285/276 |
| 1,534,173 | 4/1925 | Fogelberg ........................ 285/277 |
| 2,637,572 | 5/1953 | Bruce ............................ 285/277 X |
| 2,819,115 | 1/1958 | Arnold .......................... 285/276 X |
| 3,392,993 | 7/1968 | Myers . |
| 4,218,166 | 8/1980 | Abu-Akeel et al. .............. 901/43 X |
| 4,500,119 | 2/1985 | Geberth, Jr. ..................... 285/276 |
| 4,592,495 | 6/1986 | Toda et al. ..................... 901/43 X |
| 4,613,082 | 9/1986 | Gimple et al. ................. 901/43 X |
| 4,679,734 | 7/1987 | Mommsen et al. .............. 901/43 X |
| 4,723,713 | 2/1988 | Dahlquist ....................... 901/43 X |
| 4,753,824 | 6/1988 | Toda et al. ..................... 901/43 X |
| 4,798,341 | 1/1989 | Gimple .......................... 901/43 X |
| 5,154,357 | 10/1992 | Jamison et al. . |

FOREIGN PATENT DOCUMENTS 1053 of 1877 United Kingdom .................. 285/277

*Primary Examiner*—Andres Kashnikow
*Attorney, Agent, or Firm*—Barnes & Thornburg

[57] ABSTRACT

A robot is provided for manipulating an atomizing device. The robot has an arm having a proximal end for coupling to a robot controller and a distal end for supporting the atomizing device. The atomizing device is coupled to the source of fluid to be atomized. The coupling includes a first flexible conduit having a first end coupled to the source of fluid and a rotary fluid coupler for coupling a second end of the first flexible conduit to the atomizing device.

19 Claims, 3 Drawing Sheets

SWIVEL FLUID FITTING

This invention relates to rotary fluid connectors. It is disclosed in the context of a rotary fluid connector for a robot painter arm. However, it is believed to be useful in other applications as well.

The arm of a typical robot painter includes a manifold plate through which connections are made to the various services necessary to conduct coating operations using the robot painter. Such services include, for example, atomizing air, fan shaping air, coating material, waste drain line, and several pilot air lines. Current design manifold plates utilize standard threaded fluid fittings. These fittings work well for fluid connections on stationary equipment, but they are not suited for rotation. Fluid lines quickly become twisted, sometimes to the point of breakage, when used in robot applications. When the paint hose breaks, paint can leak into the robot arm, and the robot must be taken out of service and disassembled for clean up. Such a procedure can often take up to eight hours to complete. Swivel connections at the end of the fluid hose opposite the manifold plate end provide little relief from this problem because the torque at this end of the fluid hose is low, and, even with a swivel connection at this end, the fluid hose can still be twisted into a knot at the manifold plate.

Standard threaded fluid fittings are also difficult to install and remove because all connections through the manifold plate to the atomizer are bundled together in about a two inch (about 5.1 cm) diameter. The close proximity of all the threaded fittings to one another causes considerable difficulty in the use of standard wrenches on these fittings.

Because of these difficulties, considerable time is required to change a broken fluid hose. The invention contemplates a machined hose fitting that passes through bearings mounted in the hose assembly manifold plate. These bearings can be of any of several known types. The hose fitting employs a nut and ferrule on the fluid line to attach the fluid line, and contains between its bearing surfaces a groove that accepts a spring loaded locking pin. After the hose connection has been made, the fitting is manually pushed into the manifold plate through the bearings. The spring loaded locking pin is inserted into the edge of the manifold plate through a threaded hole which intersects the groove in the fluid fitting. When the locking pin is tightened in place, its spring-loaded pin engages and bottoms out in the groove of the fluid fitting. The spring tension of the locking pin is kept at a minimum to reduce friction, but as the fluid fitting wears, the spring keeps the locking pin bottomed in the groove of the fluid fitting. The locking pin and fluid fitting groove are square shouldered so that, once the locking pin engages the groove in the fluid fitting, the fluid fitting cannot be pulled out of the manifold plate unless the locking pin is removed. The flat bottomed locking pin makes only line contact with the machined diameter of the fluid fitting groove. This line contact keeps friction at a minimum but provides high "pull-out" force to counterbalance the forces created by robot arm movement tending to pull the fluid hose and fitting out of the manifold plate.

The fluid fitting also has a machined diameter in its end opposite the fluid hose connection to accept a fluid fitting from the atomizer with which the robot painter arm is equipped. This connection is sealed with an O-ring. The swivel fluid fitting is permitted to rotate around the atomizer fitting without fear of fluid leaks because of the O-ring.

As previously noted, the fluid hose is attached to the fitting with a ferrule and nut. A wrench is required to tighten this nut, but since the hose and fitting can be assembled with the fitting out of the manifold, there is no concern about wrench clearance. This swivel fluid fitting permits connections to the atomizer to be closely spaced, since the swivel fluid fittings can be pushed by hand into the manifold plate. The locking pins for the fittings are then installed into the edge of the manifold plate where there is abundant wrench clearance.

The swivel fluid fitting of the invention virtually eliminates fluid hose failures due to twisting. Because of the locking pin, these fittings can be replaced quickly. Hose assemblies with the fluid fittings already installed can conveniently be inventoried to reduce downtime.

According to an aspect of the invention, a robot is provided for manipulating an atomizing device. The robot has an arm having a proximal end for coupling to a robot controller and a distal end for supporting the atomizing device. Means are provided for coupling the atomizing device to the source of fluid to be atomized. The coupling means includes a first flexible conduit having a first end coupled to the source of fluid and a rotary fluid coupler for coupling a second end of the first flexible conduit to the atomizing device.

Illustratively, the combination further comprises a second flexible conduit. The rotary fluid coupler couples the second end of the first flexible conduit to the atomizing device through the second flexible conduit.

According to another aspect of the invention, a rotary fluid coupling comprises a first member having a first surface and a second surface. A first passageway extends through the first member. A second member has a first end for rotatably engaging the first member and a second end. A second passageway is provided through the second member from the first end thereof to the second end thereof. The second passageway communicates with the first passageway when the first end of the second member rotatably engages the first member. Means provide first and second bearing surfaces for bearing against the first and second surfaces, respectively, of the first member. Means fix the first bearing surface-providing means and the first surface in bearing orientation and the second bearing surface-providing means and the second surface in bearing orientation to couple the second member rotatably to the first member.

Illustratively, according to this aspect of the invention, the rotary fluid coupling defines an axis of rotation. The means providing first and second surfaces on the first member comprises a flange, and the first and second surfaces comprise an axially facing, radially and circumferentially extending first surface and an oppositely axially facing, radially and circumferentially extending second surface on the flange.

Additionally, illustratively, the first end of the second member comprises a recess for receiving, in order, the first bearing-providing means, the flange, and the second bearing-providing means. The recess includes means defining a groove adjacent the second bearing-providing means when the first bearing-providing means, the flange and the second bearing-providing means are received in the recess. A locking ring is received in the groove to fix the first bearing-providing means, the flange and the second bearing-providing means in rotary fluid coupling orientation to couple the second member rotatably to the first member.

Further, illustratively, the invention comprises a fluid source, an atomizing device, a first flexible conduit for coupling the fluid source to one of the first and second passageways, and a second flexible conduit for coupling the other of the first and second passageways to the atomizing device. Fluid from the source is supplied through the first flexible conduit, the rotary fluid coupling and the second flexible conduit to the atomizing device for atomization thereby.

According to this aspect of the invention, a robot has an arm having a proximal end for coupling to a robot controller and a distal end for supporting the atomizing device.

According to another aspect of the invention, a rotary fluid coupling comprises a first member through which the coupling is to extend. The first member has first and second surfaces, and a first passageway through the first member between the first and second surfaces. A second member has a first end for slidable insertion into the first passageway, a second end, and a second passageway through the second member from the first to the second end thereof. A third passageway also extends through the first member and intersects the first passageway. The second member has an exterior surface rotatably received in the first passageway, and provided with a discontinuity. A third member has a first end for insertion into the third passageway and a second end. The first end of the third member is resiliently urged away from the second end thereof and toward engagement with the discontinuity and is configured to engage the discontinuity to permit relative rotation of the second member and the first member when the first end of the third member engages the discontinuity.

Illustratively, according to this aspect of the invention, the discontinuity comprises a circumferential groove having a bottom wall extending axially and circumferentially of the rotary fluid coupling, a first groove wall extending radially and circumferentially of the rotary fluid coupling and a second groove wall extending radially and circumferentially of the rotary fluid coupling. The first groove wall lies between the second groove wall and the first end of the second member, and the second groove wall lies between the first groove wall and the second end of the second member.

Illustratively, the third passageway and third member are complementarily threaded along part of their lengths.

Additionally, illustratively according to this aspect of the invention, bearings ease the relative rotation of the second member and the first member. The bearings are mounted between the exterior surface and the first passageway.

Further illustratively the bearings comprise either ball or roller bearings. The bearings are provided adjacent the first ends of the first passageway and second member, and adjacent the second ends of the first passageway and second member.

Illustratively, the rotary fluid coupling further comprises a fluid seal adjacent the first end of the first passageway. This fluid seal illustratively comprises a groove adjacent the first end of the first passageway and a resilient O-ring in the groove.

Additionally, illustratively, a fluid source is coupled to the second end of the second member by a flexible conduit. The flexible conduit has a first end coupled to the fluid source, and provided with a ferrule and nut. The second end of the second member is provided with a thread on at least a portion of its exterior surface. The nut engages the thread on the exterior surface of the second member for coupling the second end of the flexible conduit to the second member.

Further illustratively, an atomizing device is coupled to the first end of the second passageway. The atomizing device is mounted adjacent the first surface of the first member. A robot having an arm with a proximal end for coupling to the robot controller and a distal end for supporting the atomizing device manipulates the atomizing device. The second surface of the first member is mounted from the distal end of the arm.

The invention may best be understood by referring to the following description and accompanying drawings which illustrate the invention. In the drawings.

Figure 1:
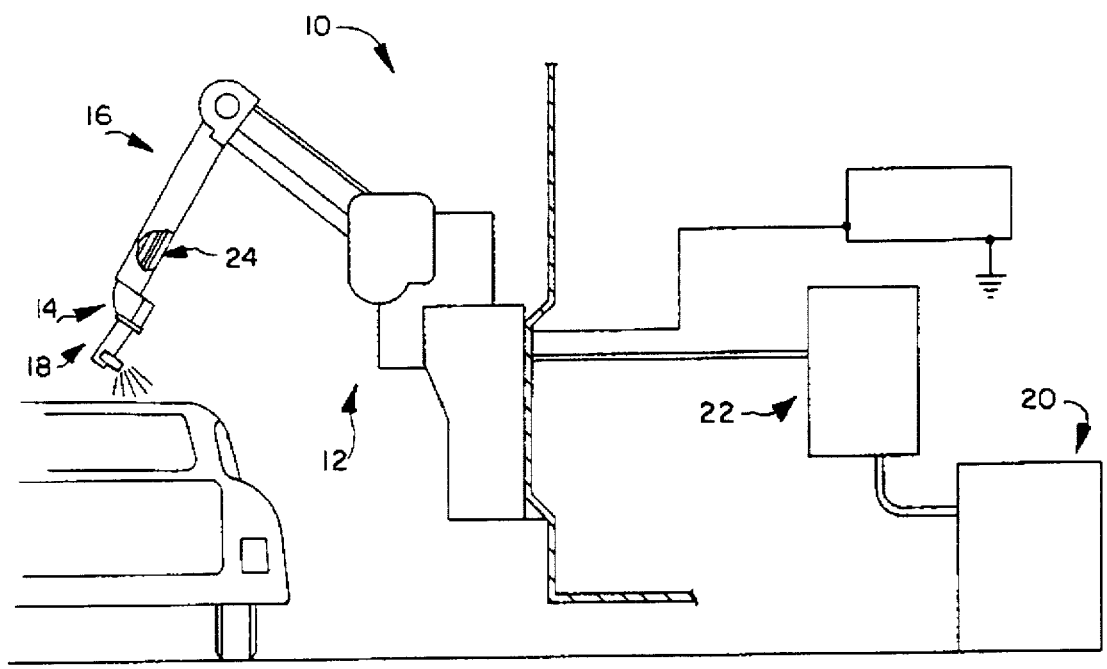
FIG. 1 illustrates a diagrammatic, partly broken away and partly sectional side elevational view of a system constructed according to the present invention.
Figure 3:
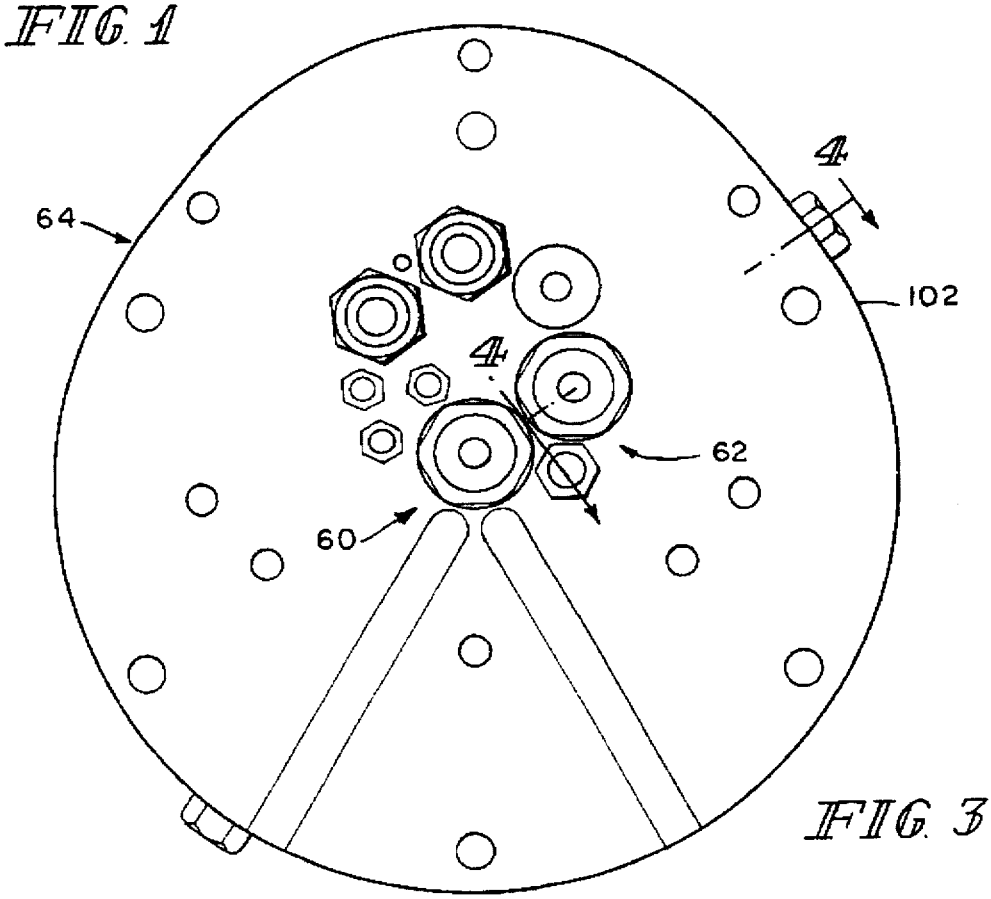
FIG. 3 illustrates a robot wrist-side elevational view of a hose assembly manifold plate according to the present invention.
Figure 2:
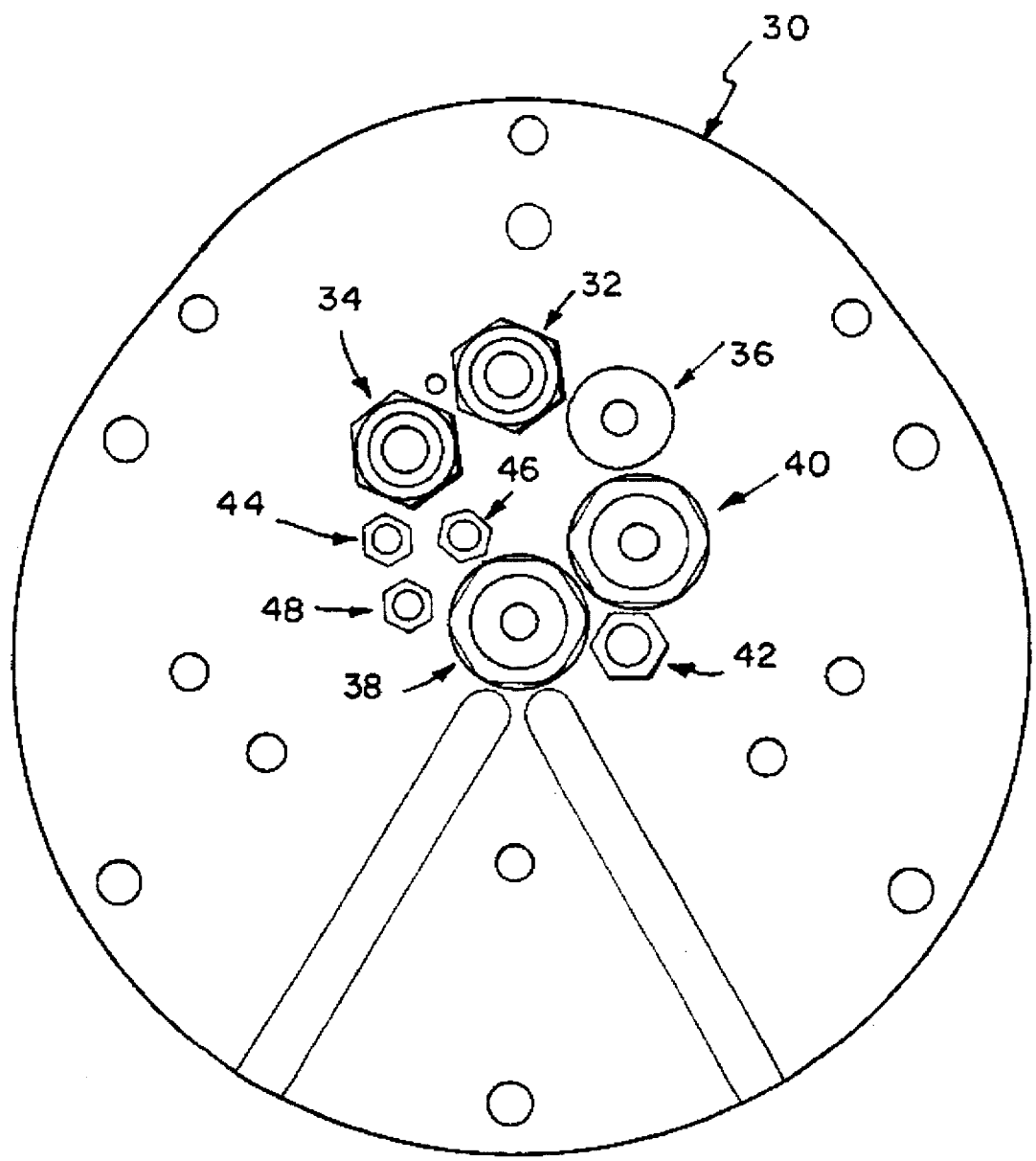
FIG. 2 illustrates a robot wrist-side elevational view of a prior art hose assembly manifold plate for a robot painter arm.
Figure 4:
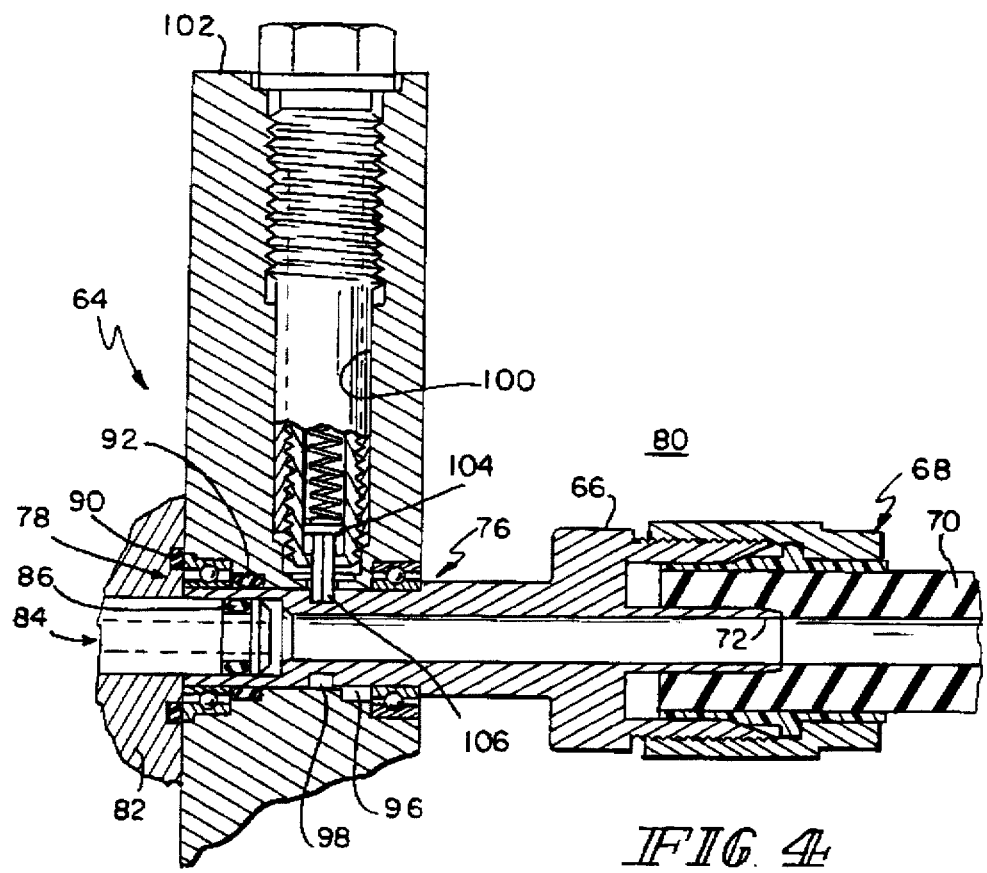

FIG. 4 illustrates a fragmentary sectional view of the manifold plate of FIG. 3, taken generally along section lines 4—4 of FIG. 3;

FIG. 5 illustrates a longitudinal sectional view through another fitting constructed according to the invention; and, FIG. 6 illustrates a longitudinal sectional view through another fitting constructed according to the invention.

As best illustrated in FIG. 1, a system 10 incorporating the present invention comprises a coating robot 12, such as a General Motors-Fanuc Model P-150 robot, at the remote end 14 of the arm 16 of which is mounted a coating dispensing device 18, such as a Model EMF dual-headed, electrostatic, water- or solvent-base base paint spray gun available from ITW Automotive Division, 8227 Northwest Boulevard, Suite 230, Indianapolis, Ind. 46278. Depending upon the application and/or the type of dispensing device employed in a particular coating operation, it may be necessary to mount the dispensing device 18 on an insulator (not shown) to isolate it electrically from the robot arm 16.

The dispensing device 18 is selectively coupled to a source 20 of coating material. If the coating material is electrically conductive, it may be necessary to couple the device 18 to the source 20 through a voltage block 22, for example, of the type described in U.S. Pat. No. 5,154,357. A hose assembly manifold plate is provided between the remote end 24 of the robot arm 16 and the dispensing device 18 to couple the dispensing device 18 to the lines through which various services are provided to the dispensing device 18.

A prior art manifold plate 30 is illustrated in FIG. 2. It includes connections for atomizing air 32, fan shaping air 34, electrical cable 36, a paint supply line 38, a waste fluid, or dump, line 40, exhaust air 42 and pilot air signal lines for the paint pressure regulator 44, paint trigger valve 46, and dump valve 48. Typically, these service lines extend through an approximately two inch (about 5.1 cm) diameter robot wrist some two to three inches (about 5.1 to about 7.6 cm) away from the manifold plate. Consequently, all of these connections are made to the robot arm 16 side or wrist side of manifold plate 30 within about a two inch (about 5.1 cm) diameter circle. A hose or line for air or liquid is attached to each of these connections, except, of course, for the electrical connection. An electrical cable is connected there. As will be appreciated, this close spacing limits the amount of manipulation of these fittings and the hoses that are attached to them. Additionally, these connections are not rotary connections. Movement of the robot arm 16 can result in twisting and breakage of the lines. This can be particularly messy if the paint line 38 or the dump line 40 is broken. Paint or waste can leak into the robot arm 16. This ordinarily will result in the robot 12 having to be taken out of service, disassembled, cleaned, and reassembled prior to being placed back in service. This can take a day or longer.

Referring now to FIGS. 3–4, modified paint supply 60 and dump 62 connections have been incorporated into a manifold plate 64. Each of the connections 60, 62 is provided with an outer fluid fitting 66 provided with a ferrule nut 68 for connecting the paint supply or dump hose 70 to the fitting 66. An internal male stem 72 extends into the open lumen of the hose 70 to receive or transfer the liquid paint or waste liquid, respectively, from or to the hose 70. Fitting 66 extends through bearings 76, 78 on the wrist 80 and atomizer 82 sides, respectively, of the manifold plate 64. The illustrated bearings 76, 78 are ball bearings. While ball bearings are an excellent choice for this application because they can be of the sealed and permanently lubricated type, sealed, permanently lubricated roller bearings or sleeve bearings can also be used with satisfactory results. Sleeve bearings will be characterized by slightly higher friction because a sleeve bearing will contact the fitting 66 along a substantially greater portion of its length. However, since the entire fitting 66 is machined for relatively free sliding insertion through the manifold plate 64, even this friction should not be excessive.

At its atomizer 82 end, each fitting 66 is adapted to receive an atomizer fluid fitting 84 equipped with an O-ring 86 to seal the connection against leakage of paint or waste liquid. Additionally, a face-sealing O-ring 90 and an O-ring seal 92 are provided to reduce the likelihood of leakage between the atomizer 82 and manifold plate 64, and along the fitting 66 past the bearing 78.

The outside surface 96 of each fitting 66 is provided with a circumferential retaining groove 98. A passageway 100 extends inwardly from the edge 102 of manifold plate 64 and is threaded along part of its length. Each passageway 100 threadedly receives a spring loaded locking pin 104. The distal end 106 of each locking pin 104 is designed to enter the retaining groove 98 of a respective fitting 66, and remain engaged with the respective retaining groove 98 until the respective locking pin 104 is removed, disengaging it and permitting the respective fitting 66 to be withdrawn from the manifold plate 64.

Figure 5:
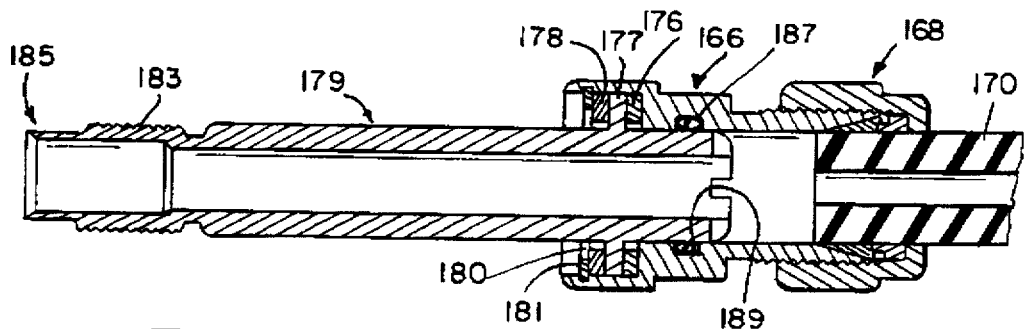

Referring now to FIG. 5, another embodiment of the invention is provided with an outer fluid fitting 166 provided with a ferrule nut 168 for connecting the paint supply or dump hose 170 to the fitting 166. Fitting 166 receives a thrust washer 176, the retaining flange or collar 177 of a connector 179, and a thrust washer 178. The opposite, axially facing surfaces of flange 177 are flat and smooth to bear slidably against the abutting faces of washers 176, 178. Relative rotation between connector 179 and fitting 166 is thus achieved. A snap-type locking ring 180 snaps into a groove 181 provided therefor in fitting 166 to capture fitting 166 and connector 179 in this relatively rotatable configuration. Threads 183 on the opposite end 185 of connector 179 engage complementary threads in the paint or waste opening, respectively, of a manifold plate, not shown, of the general type illustrated in FIGS. 3–4 to fix connector 179 in the manifold plate. The interior of end 185 of connector 179 is configured to receive an atomizer fluid fitting of the general type illustrated at 84 in FIGS. 3–4. An appropriate O-ring seal 187 is provided in a groove 189 around the interior circumference of fitting 166 to seal against the outer circumference of connector 179 where the outer circumference of connector 179 is rotatably received within the interior circumference of fitting 166.

Figure 6:
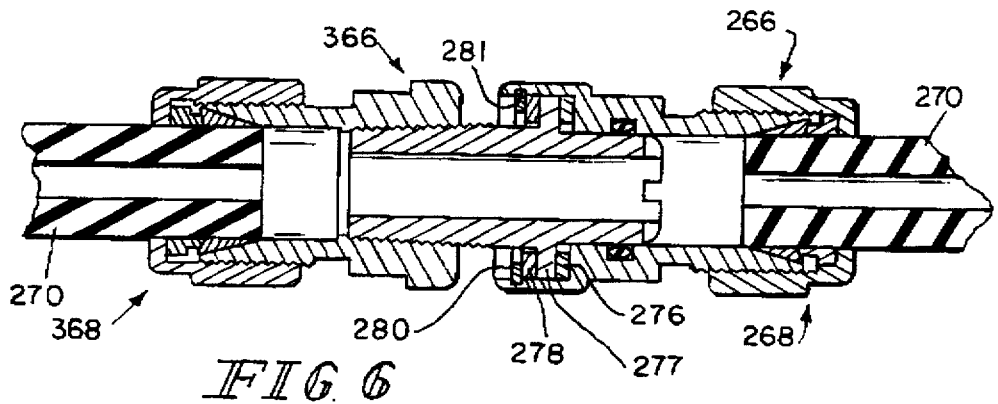

Referring to FIG. 6, another embodiment of the invention is provided with fluid fittings 266, 366 provided with ferrule nuts 268, 368 for placement in the paint supply or dump hose 270 adjacent to, but spaced a short distance from, the manifold plate. This connection can be located, for example, in the wrist about two inches (about 5 cm) from the manifold plate. Fitting 266 receives a thrust washer 276, the retaining flange or collar 277 of fitting 366, and a thrust washer 278. The opposite, axially facing surfaces of flange 277 are flat and smooth to bear slidably against the abutting faces of washers 276, 278. Relative rotation between fittings 266, 366 is thus achieved. A snap-type locking ring 280 snaps into a groove 281 provided therefor in fitting 266 to capture fittings 266 and 366 in this relatively rotatable configuration. The connection of hose 270 to the manifold plate need not be a rotary connection. In this embodiment, the hose 270 is cut at the location at which the rotary connection is to be made. This gives the user the flexibility to decide how far up the robot arm from the manifold plate to place the rotary connection.

What is claimed is:

1. In combination, an atomizing device, a source of fluid to be atomized by the atomizing device, a robot for manipulating the atomizing device, the robot having an arm having a proximal end for coupling to a robot controller and a distal end for supporting the atomizing device, and means for coupling the atomizing device to the source of fluid to be atomized, the coupling means including a first flexible conduit having a first end coupled to the source of fluid and a rotary fluid coupler for coupling a second end of the first flexible conduit to the atomizing device, the rotary fluid coupler comprising a first member through which the coupling is to extend, the first member having a first surface and a second surface, means providing a first passageway through the first member between the first surface thereof and the second surface thereof, the first passageway having first and second ends, a second member having a first end for slidable insertion into the first passageway and a second end, means providing a second passageway through the second member from the first end thereof to the second end thereof, means providing a third passageway through the first member, the third passageway intersecting the first passageway, the second member having an exterior surface for being rotatably received in the first passageway, the exterior surface of the second member being provided with a discontinuity, a third member for insertion into the third passageway, the third member having a first end for insertion into the third passageway and a second end, the first end of the third member being resiliently urged away from the second end thereof and toward engagement with the discontinuity and configured to engage the discontinuity to permit relative rotation of the second member and the first member while preventing sliding movement of the second member axially of the first passageway when the first end of the third member engages the discontinuity.

2. The combination of claim 1 and further comprising a second flexible conduit, the rotary fluid coupler coupling the second end of the first flexible conduit to the atomizing device through the second flexible conduit.

3. The combination of claim 1 wherein the discontinuity comprises a circumferential groove having a bottom wall extending axially and circumferentially of the rotary fluid coupling, a first groove wall extending radially and circumferentially of the rotary fluid coupling and a second groove wall extending radially and circumferentially of the rotary fluid coupling, the first groove wall lying between the second groove wall and the first end of the second member and the second groove wall lying between the first groove wall and the second end of the second member.

4. The combination of claim 3 wherein the third passageway and third member are complementarily threaded along part of their lengths.

5. The combination of claim 1 and further comprising bearing means for easing the relative rotation of the second member and the first member, the bearing means mounted between the exterior surface and the first passageway.

6. The combination of claim 5 wherein the bearing means comprises one of ball and roller bearings, the bearing mean provided adjacent the first ends of the first passageway and second member and adjacent the second ends of the first passageway and second member.

7. The combination of claim 1 further comprising means providing a fluid seal adjacent the first end of the first passageway.

8. The combination of claim 7 wherein the means providing a fluid seal comprises means providing a groove adjacent the first end of the first passageway and a resilient O-ring in said groove.

9. The combination of claim 1 wherein the second end of the second member is provided with a thread on at least a portion of its exterior surface, and a ferrule and nut on the second end of the flexible conduit, the nut for engaging the thread on the exterior surface of the second member for coupling the second end of the flexible conduit to the second member.

10. The combination of claim 1 and further comprising means for mounting the atomizing device adjacent the first surface of the first member, and means for mounting the second surface of the first member from the distal end of the arm.

11. A rotary fluid coupling comprising a first member through which the coupling is to extend, the first member having a first surface and a second surface, means providing a first passageway through the first member between the first surface thereof and the second surface thereof, the first passageway having first and second ends, a second member having a first end for slidable insertion into the first passageway and a second end, means providing a second passageway through the second member from the first end thereof to the second end thereof, means providing a third passageway through the first member, the third passageway intersecting the first passageway, the second member having an exterior surface for being rotatably received in the first passageway, the exterior surface of the second member being provided with a discontinuity, a third member for insertion into the third passageway, the third member having a first end for insertion into the third passageway and a second end, the first end of the third member being resiliently urged away from the second end thereof and toward engagement with the discontinuity and configured to engage the discontinuity to permit relative rotation of the second member and the first member while preventing sliding movement of the second member axially of the first passageway when the first end of the third member engages the discontinuity.

12. The rotary fluid coupling of claim 11 wherein the discontinuity comprises a circumferential groove having a bottom wall extending axially and circumferentially of the rotary fluid coupling, a first groove wall extending radially and circumferentially of the rotary fluid coupling and a second groove wall extending radially and circumferentially of the rotary fluid coupling, the first groove wall lying between the second groove wall and the first end of the second member and the second groove wall lying between the first groove wall and the second end of the second member.

13. The rotary fluid coupling of claim 12 wherein the third passageway and third member are complementarily threaded along part of their lengths.

14. The rotary fluid coupling of claim 11 and further comprising bearing means for easing the relative rotation of the second member and the first member, the bearing means mounted between the exterior surface and the first passageway.

15. The rotary fluid coupling of claim 14 wherein the bearing means comprises one of ball and roller bearings, the bearing means provided adjacent the first ends of the first passageway and second member and adjacent the second ends of the first passageway and second member.

16. The rotary fluid coupling of claim 11 further comprising means providing a fluid seal adjacent the first end of the first passageway.

17. The rotary fluid coupling of claim 16 wherein the means providing a fluid seal comprises means providing a groove adjacent the first end of the first passageway and a resilient O-ring in said groove.

18. In combination, the rotary fluid coupling of claim 11 and a fluid source, a flexible conduit for coupling the fluid source to the second end of the second member, the flexible conduit having first and second ends, the first end of the flexible conduit coupled to the fluid source, the second end of the second member being provided with a thread on at least a portion of its exterior surface, and a ferrule and nut on the second end of the flexible conduit, the nut for engaging the thread on the exterior surface of the second member for coupling the second end of the flexible conduit to the second member.

19. In combination, the rotary fluid coupling of claim 11 and an atomizing device for coupling to the first end of the second passageway, means for mounting the atomizing device adjacent the first surface of the first member, a robot for manipulating the atomizing device, the robot having an arm having a proximal end for coupling to the robot controller and a distal end for supporting the atomizing device, and means for mounting the second surface of the first member from the distal end of the arm.

* * * * *